United States Patent
Long et al.

(10) Patent No.: US 7,486,608 B1
(45) Date of Patent: Feb. 3, 2009

(54) EFFICIENT IMPLEMENTATION OF LOW POWER MODE IN DIGITAL SUBSCRIBER LINE (DSL) TRANSCEIVERS

(75) Inventors: Guozhu Long, Newark, CA (US); Anthony J. P. O'Toole, Los Gatos, CA (US); Mark Hashemi, Sunnyvale, CA (US)

(73) Assignee: Ikanos Communications, Inc., Fremont, CA (US)

( * ) Notice: Subject to any disclaimer, the term of this patent is extended or adjusted under 35 U.S.C. 154(b) by 1260 days.

(21) Appl. No.: 10/714,354

(22) Filed: Nov. 14, 2003

Related U.S. Application Data

(60) Provisional application No. 60/426,674, filed on Nov. 14, 2002.

(51) Int. Cl.
*H04J 11/00* (2006.01)
(52) U.S. Cl. .................. 370/207; 375/261
(58) Field of Classification Search ........... 370/206, 370/207; 375/222, 260, 261, 262, 263, 264, 375/265, 298
See application file for complete search history.

(56) References Cited

U.S. PATENT DOCUMENTS

| | | | | |
|---|---|---|---|---|
| 5,479,447 A | * | 12/1995 | Chow et al. ............ | 375/260 |
| 6,219,378 B1 | * | 4/2001 | Wu ..................... | 375/231 |
| 7,088,781 B2 | * | 8/2006 | Betts .................. | 375/260 |
| 7,110,467 B2 | * | 9/2006 | Mitlin et al. ........... | 375/295 |
| 7,177,350 B1 | * | 2/2007 | Long et al. ............. | 375/222 |
| 7,218,642 B2 | * | 5/2007 | Insler et al. ........... | 370/465 |
| 7,263,130 B1 | * | 8/2007 | Mitlin ................. | 375/260 |
| 7,418,048 B2 | * | 8/2008 | Betts .................. | 375/260 |
| 2001/0022777 A1 | * | 9/2001 | Bourget et al. .......... | 370/210 |

OTHER PUBLICATIONS

"Proposal for ADSL Transmission in Compliance with G.992.3 in the presence of TCM ISDN", Texas Instruments, STMicroelectronics, Oct. 21-25, 2002, pp. 1-47, Osaka, Japan.

* cited by examiner

*Primary Examiner*—Chi H. Pham
*Assistant Examiner*—Kevin Mew
(74) *Attorney, Agent, or Firm*—IP Creators; Charles C Cary

(57) ABSTRACT

Efficient implementation techniques of a low power mode, (i.e. L2 mode for ADSL2) for DSL transceivers are described. The techniques save memory space and reduce implementation complexity. A constellation mapper in a DSL transmitter determines the number of bits to be retrieved for an ith sub-carrier in the low power mode based on the number of bits allocated for this same sub-carrier in a normal transmission mode, (e.g. L0 mode in ADSL2) and a bit allocation threshold T. A constellation demapper in a DSL receiver determines the number of bits used for an ith sub-carrier in the low power mode based on the bit tables for the L0 mode and the bit threshold T.

16 Claims, 3 Drawing Sheets

EFFICIENT IMPLEMENTATION OF LOW POWER MODE IN DIGITAL SUBSCRIBER LINE (DSL) TRANSCEIVERS

CROSS-REFERENCE TO RELATED APPLICATION

This application claims priority under 35 U.S.C. § 119(e) to U.S. provisional patent application, "Efficient Implementation of Power Management Mode in Digital Subscriber Line (DSL) Transceivers," having a Ser. No. 60/426,674 and a filing date of Nov. 14, 2002, and which is hereby incorporated by reference in its entirety.

FIELD OF THE INVENTION

The present invention is generally related to optimizing memory storage requirements in a low power mode in Digital Subscriber Line (DSL) technology, and more particularly, in Asymmetric DSL (ADSL) transceivers.

BACKGROUND

Digital Subscriber Line (DSL) systems are high-bandwidth technologies that use the existing copper-cable telephone lines. Asymmetric Digital Subscriber Line (ADSL) is particularly attractive for consumer Internet applications where most of the data traffic is downloaded to the customer. Upstream bandwidth for uploading data can be reduced to increase downstream bandwidth since most Internet traffic is downstream traffic.

Examples of multicarrier transmission techniques used in DSL systems include Quadrature Amplitude Modulation (QAM) and a version of QAM known as Discrete Multitone (DMT). In DMT, a channel comprises sub-channels, also referred to as frequency bins, bins, or sub-carriers. Each sub-channel has sine and cosine frequencies that are integer multiples of a common frequency, the inverse of this common frequency being the symbol period. The amplitude and phase of each bin or sub-carrier represents a group of information bits. Each sub-channel is encoded to a point in a constellation having points wherein each point is unique for each combination of bits. For example, a sub-channel carrying a 2-bit symbol would be encoded using a 4-point constellation, and a 3 bit symbol in another sub-channel would be encoded for an 8-point constellation.

Recently, the ITU-T standards body defined a new generation of ADSL, also referred to as G.992.3 or ADSL2. The previous generation of ADSL standards (G.992.1) included an Annex C, which describes techniques for operating ADSL in the same cable binder as TCM-ISDN signaling. A similar annex is being defined for G.992.3.

G.992.3 provides three mandatory link states or power management states or modes. One is referred to as L0 state and is named "Full On." The ADSL link is fully functional in L0 meaning normal data transmission of payload data can occur. Another state is the L2 state and is named "Low Power." In this state, the ADLS link is active, but a low power signal conveying background data is sent from the ATU-C (transmitter) to the ATU-R (receiver). A normal data carrying signal is transmitted from the ATU-R to the ATU-C. A third state is the L3 state called "Idle" in which there is no signal transmitted so that the transceiver ATU may be powered or unpowered. For each of the L0 and L2 states, there is a bitmap identifying the sub-carriers used in that mode, and associated bitmap tables including a bit allocation table and a gain table for each state are stored in memory. The bits per bin and gain factor per bin for the L0 mode are determined during initialization in order to achieve a signal-to-noise ratio (SNR) margin. The SNR margin is the maximum increase (in dB) of the received noise power, such that the ATU can still meet all the target bit error rates (BERs) over all the frame bearers. The bit allocation table is the number of bits, $b_i$, allocated for each frequency or subcarrier i in ascending order from one to the number of sub-carriers used −1. For each sub-carrier, there is also a relative gain defined, $g_i$, stored in a gain table, indexed in the same order as the bit allocation table. The relative gain may also be referred to as a gain scale factor, a transmit gain factor, a fine gain adjustment, or a fine tune gain. The $g_i$ values define a scaling of the root mean square (rms) subcarrier power levels relative to a downstream reference transmit power spectral density (REFPSDs) level. For G.992.3, $g_i$ values in dB=20 log ($g_i$ in linear scale). Additionally, a tone ordering table for each state may also be used, and it defines the sequence in which subcarriers are assigned bits from an input bit stream.

Upon transition of the system to L2 mode, other bit and gain tables ($b_i$, $g_i$) are provided by the receiver in order to achieve a lower data rate for the reduced power level. For example, in G.992.3, the transmitter sends an L2 Request message for entry into the L2 state including a minimum power cutback value (minimum PCBds value in dB) and a maximum power cutback value (maximum PCBds value in dB). The receiver will send either a L2 Reject or a L2 Grant message or command. An L2 Reject command may be sent, for instance, if the cutback values are not within an allowed range or because the current line and noise conditions cannot satisfy the desired operating condition. An L2 Grant message includes the actual power cutback value and the bitmap with the bits and gain tables to be used by the ATUs in the downstream direction. The bit and gain tables for L0 mode (normal data transmission) need to be stored so that the modem can quickly resume L0 mode data transmission without retraining. This imposes memory storage requirements for two (2) bitmaps in a modem to accommodate both the L0 and L2 modes.

Additionally, there are certain system environments that use a plurality of bitmaps during normal data transmission. Annex C addresses the operation of ADSL transceivers operating over copper telephone lines in the same cable binder as Time Compression Multiplexing (TCM)-Integrated Services Digital Network (ISDN) signaling. These Annex C transceivers use 2 bitmaps during normal transmission, to deal with near-end (NEXT) and far-end (FEXT) crosstalk. For the transmitter, the FEXTC bitmap is used in 128 DMT symbols in a hyperframe of 345 DMT symbols and the NEXTC bitmap is used in 217 DMT symbols in a hyperframe of 345 DMT symbols. For the L2 mode in Annex C, memory space for the bitmap tables of 2 bitmaps must be accommodated instead of just for one. L2 mode imposes higher demand for memory space, especially when the number of sub-carriers (NSC) is increased.

It is therefore desirable to reduce the memory requirement in L2 mode operation.

SUMMARY OF THE INVENTION

The present invention efficiently implements a low power mode by saving memory space and reducing implementation complexity. A system in accordance with an embodiment of the present invention comprises a DSL transmitter unit in a transceiver comprising a constellation mapper being accessible to a memory storing bit allocations for a normal data transmission (e.g., L0 mode), and gain factors for the normal state, and a bit allocation threshold T. The constellation mapper determines the number of bits to be retrieved for an ith sub-carrier, $b_i'$, in the low power mode based on the number of bits allocated, $b_i$, for this same sub-carrier in the normal transmission mode and a bit allocation threshold T. The constellation mapper is communicatively coupled to a constellation encoder/gain scaling unit which encodes the determined $b_i'$ for the low power mode as a symbol. In one embodiment, the symbol's gain factor is the gain scale factor $g_i$ for the same bin in the normal transmission mode. The system further comprises a control unit communicatively coupled to the constellation mapper and having access to the memory, the control unit processing messages related to the low power mode such as those related to mode exit and entry and other aspects of mode operation.

In another embodiment of the present invention, the system comprises a DSL receiver unit in a transceiver comprising a constellation demapper being accessible to a memory storing bit allocations for the normal mode and the bit allocation size threshold T. The demapper determines the $b_i'$ used for the low power mode by the transmitter for each of the bins based on the bit allocations for the normal mode and the bit allocation threshold T.

The present invention also provides a method for reusing bit allocations for the normal data transmission mode in a low power mode for use in a DSL transmitter in accordance with an embodiment of the present invention. The present invention also provides a method for reusing bit allocations for a normal data transmission mode in a low power mode for use in a DSL receiver in accordance with an embodiment of the present invention.

DETAILED DESCRIPTION OF THE DRAWINGS

Figure 1:
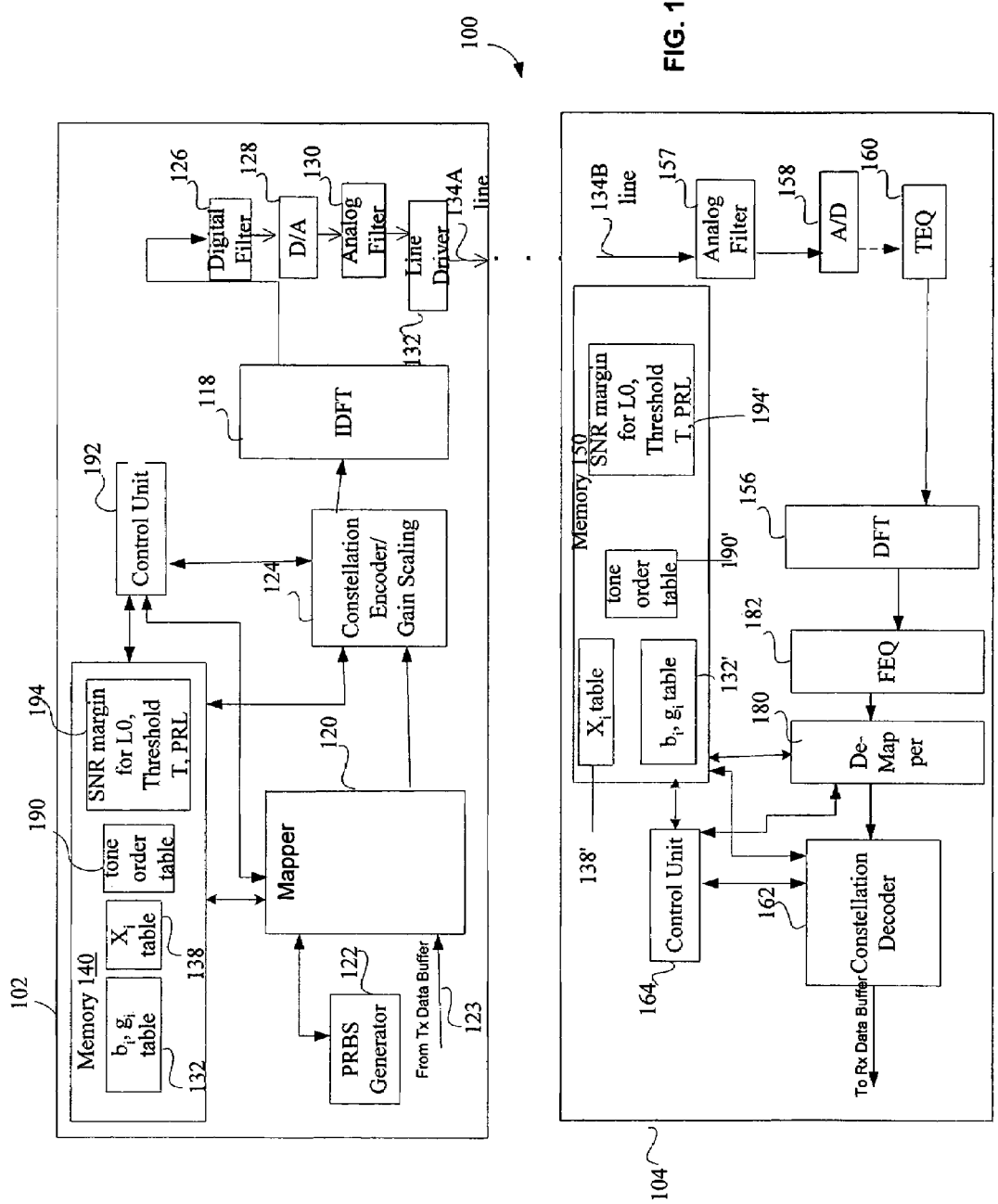
FIG. 1 illustrates an ADSL transmission system having a transmitter and a receiver in accordance with an embodiment of the present invention.

FIG. 1 illustrates an ADSL transmission system 100 in accordance with an embodiment of the present invention. FIG. 1 illustrates Physical Media Dependent (PMD) functional blocks in a transmitter and receiver, respectively, in accordance with one embodiment of the present invention. The system has an embodiment of a transmitter 102 located at one node of the system, for example at a central office that accesses a high speed data network, and an embodiment of a receiver 104 located at another end of the system, for example a remote location such as a customer premises having access to the customer's data terminal equipment. In another embodiment of the invention, the locations of the transmitter 102 and receiver 104 may be reversed.

Additionally, one or more of the elements shown in FIG. 1 may be embodied in software, hardware, firmware, or any combination thereof and/or stored in, for example, a computer usable or computer readable medium. Those skilled in the art will appreciate that although the elements are depicted as individual units, any combination of the elements of the transmitter, the receiver or both may also be embodied in software, hardware, firmware or any combination thereof and/or stored in, for example, a computer usable or computer readable medium or be embodied in circuitry or as a set of instructions executing on a digital signal processor (DSP) chip.

In FIG. 1, the transmitter 102 comprises a memory 140 having a $\{b_i, g_i\}$ table 132, a table of a set of input bits $\{X_i\}$ 138 that will be encoded to represent an L2 signal (e.g. background data) for each bin used during L2, a tone order table 190 and values 194 such as the last SNR margin stored for L0 upon entry into the L2 state, a bit threshold T, and a power reduction limit (PRL). A control unit 192 is communicatively coupled to the memory 140, a mapper unit 120, and a constellation encoder/gain scaling unit 124. The control unit 192 performs control functions such as determining whether L2 entry and exit criteria have been satisfied and executes instructions for performing processing associated with L2 messages. The mapper unit 120 is accessible to memory 140 and is communicatively coupled to a pseudo-random bit sequence (PRBS) generator 122. The mapper 120 selects input bits from a Tx Data buffer or alternatively from the PRBS generator 122.

A constellation encoder/gain scaling unit 124 is accessible to the memory 140 and encodes the input bits for each ith sub-carrier received from the mapper unit 120 to its corresponding constellation point represented as a complex number $Z_i = g_i * (X_i + jY_i)$. An Inverse Discrete Fourier Transform Module 118, which may also be an Inverse Fast Fourier Transform module, is communicatively coupled to receive the complex outputs from the constellation encoder 124. The Inverse Discrete Fourier Transform module 118 transforms each input to a time domain symbol signal. The time domain symbols are then forwarded to the digital filter 126, and from there to the digital to analog converter 128. The samples in analog form are then forwarded to an analog filter 130 and to the line driver 132 for amplification. From there, the symbols are transmitted over a transmission path 134A beginning, in this embodiment with a telephone line, to ultimately arrive at a receiver 104.

The receiver 104 receives the time domain signals in analog form from the end of the transmission path 134B, e.g. a telephone line, which are forwarded to an analog filter 157 which, filters the signals, and forwards them to an analog to digital converter 158 for conversion to digital form. The signal samples now in digital form are forwarded to a time-domain equalizer (TEQ) 160. The samples are then sent to a discrete Fourier transform (DFT) demodulator 156 which may be a Fast Fourier Transform (FFT) demodulator. The Fourier transformer 156 separates and demodulates all the sub-channels. After the demodulator 156, the signals for each bin or sub-channel are forwarded to a FEQ module 182.

The receiver also comprises a control unit 164 communicatively coupled to the memory 150, the constellation decoder 162, and the demapper module 180. The control unit 164 processes messages from the transmitter 102, including those for the L2 mode. The memory 150 stores a $\{b_i, g_i\}$ table 132', a table of mappings corresponding to the set of input bits $\{X_i\}$ 138' (e.g. background data) for each bin used during L2, a corresponding tone order table 190' and values 194' for the last SNR margin stored for L0 upon entry into the L2 state, and the bit allocation size threshold T, and the power reduction limit (PRL) used by the transmitter. The memory is also accessible to the demapper 180 and the decoder 162.

In order to be decoded, the same constellation mapping on each bin as used in the transmitter must be used. Therefore, the demapper 180 determines the $b_i$'s used for L2 mode by the transmitter for each of the bins based on the bit allocation size $b_i$ values for the L0 mode. The demapper 180 is communicatively coupled to receive the signals from the FEQ module. The demapper 180 determines the number of bits, $b_i'$, for each bin for the low power mode and forwards an indicator of the determined number for each bin to the decoder. Based on the determined $b_i'$'s for L2 mode, the constellation decoder module 162 identifies bins that do not need to be decoded, ($b_i'=0$). For the others, it decodes each symbol for the proper constellation size as identified by its $b_i'$.

For ADSL2 transceivers, transitioning from the L0 "Full On" state to the L2 mode "Low Power" state is achieved through a series of messages as described in G.992.3 ADSL2. These messages are also referred to in the standard as the power management commands. Using the transmitter 102 and the receiver 104 of FIG. 1 for illustrative purposes, the following exchange of messages transitions these devices to the L2 mode. As discussed above, responsive to the L2 Request command message and the request being able to be supported, the receiver control unit 164 sends back the number of sub-carrier $N_f$ to be changed in L2. In one aspect of the present invention, the receiver does not need to send the bitmap tables (e.g. $b_i$ $g_i$ table) for L2 describing the $b_i$ and $g_i$ sub-carrier parameter fields for each sub-carrier because the corresponding tables from L0 mode can be used in L2.

As discussed above, the L2 Request that the transmitter control unit 192 sends to the receiver control unit 164 includes minimum and maximum power cutback (PCBds) values. Additionally, after entry into the L2 mode, the control unit 192 may send an L2 Trim message including a proposed new PCBds value. To achieve a low power state, excess power margin is trimmed suitable for supporting the lower data rate in the L2 mode. Power trimming is defined in G.992.3 as a lowering of the reference transmit PSD level which is achieved through a higher downstream power cutback level than in L0 mode. Because the reference PSD level to which the L0 gain factors are scaled is reduced, the scale factors $g_i$ for L0 in unaffected form may be used. In another example, the gain values transmitted for L2 may be adjusted by the gain scaling portion of the encoder unit 124 to adjust the gain per sub-carrier. The power cutback levels are defined in terms of absolute power levels. In one example, G.992.3 states that values not inclusively within the range of the PCBds determined during initialization to 40 dB are not encoded. So 40 dB is an example of a maximum allowable power reduction or cutback level.

In one aspect of the present invention, the signal-to-noise ratio (SNR) margin for the L2 mode becomes the L0 mode SNR margin plus the difference between the SNR required to support a T bit constellation and a constant bit size for a constellation, which is approximately (T−constant)*a power factor. An example of the constant bit size is two. An example of a power factor is 3 dB. Approximately, additional 3 dB SNR is needed to support one more bit. Using this example, the transmitter control unit 192 may indicate in a message that the transmitter is trimming its transmit power (TX) up to (T−2)*3 dB. However, to reduce the transmit power TX, T has to be greater than 2. Modem users may also set a user defined power reduction limit for L2 mode (PRL) by setting the appropriate control parameter. In one example, the maximum allowable power reduction is the lesser of the user defined PRL and (T−constant)*power factor.

T is a $b_i$ threshold T which is determined based on a required data rate in L2 mode and the L0 mode $b_i$ $g_i$ tables. In one example, T may be predetermined off line based on a pre-established data rate for L2 mode and a predetermined SNR margin for L2. In another example, the bit threshold T may also be set to the maximum constellation size or $b_i$ returned in the L2 Grant message from the receiver. For example, an octet can be used in the L2 Grant command to send T.

Figure 2:
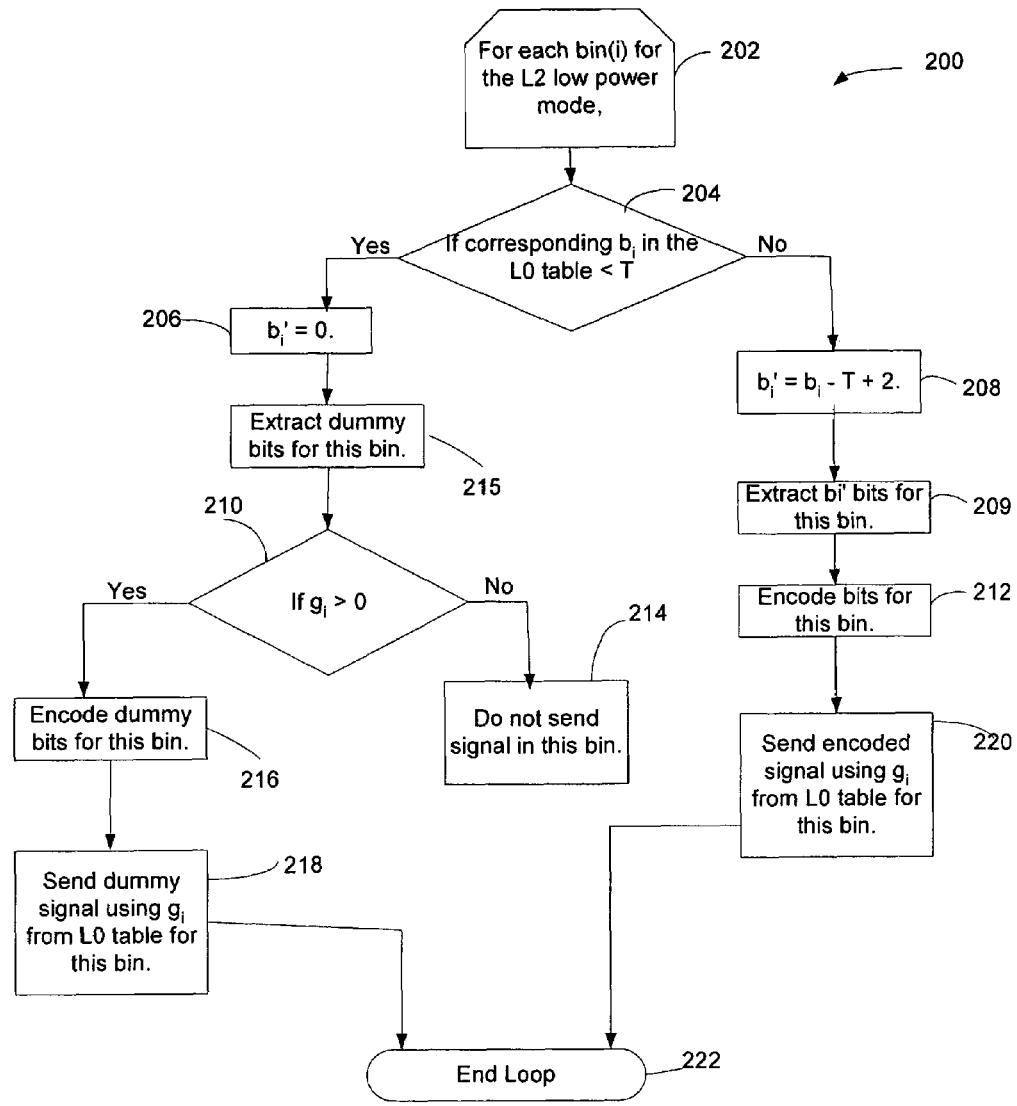
FIG. 2 illustrates a method for reusing bit allocations and gain factors for a normal data transmission mode in a low power mode for use in a DSL transmitter in accordance with an embodiment of the present invention.

FIG. 2 illustrates a method 200 for reusing bit allocations and gain factors for the normal data transmission mode, L0 in this example, in a low power mode, L2 in this example, for use in an ADSL transmitter in accordance with an embodiment of the present invention. The method embodiment 200 is discussed in the context of the transmitter 102 of FIG. 1 for illustrative purposes. For 202 each sub-carrier or bin(i) for the L2 low power mode, the mapper unit 120 determines 204 whether the corresponding number of bits allocated, $b_i$, for the ith sub-carrier in the L0 table is less than the $b_i$ threshold T. Responsive to the $b_i$ in the L0 table being less than the threshold T, the $b_i'$ for the bin for L2 mode is determined to be zero. The mapper 120 extracts no bits from the Tx data buffer, and instead extracts 215 a default number of bits, for example, two dummy bits, $b_i'=2$ bits, from the PRBS generator 122. Responsive to the $g_i$ gain scale factor for this bin $b_i$ in the L0 table being zero 210, the constellation encoder effectively does not send 214 a signal in this bin. (e.g. $Z_i=g_i*(X_i+jY_i)$) Responsive to $g_i>0$ 210, the dummy bits are encoded 216 as a dummy signal using the gain scale factor $g_i$ from the L0 table for this bin. Responsive to the corresponding $b_i$ in the L0 table being greater than or equal to the bit threshold T, the number of bits to be allocated in L2 mode, $b_i'$ for this bin is set 208 as follows, $b_i'=b_i-T+a$ constant. In one example, the constant is 2. Alternatively, $b_i'$ can be set to a preset value, for example 2. The number of bits, $b_i'$ for this bin are extracted 209 by the mapper 120 from the Tx data buffer. The constellation encoder 124 encodes 212 the extracted bits. The transmitter 102 sends 220 the encoded signal using $g_i$ from the L0 table for this bin.

In one example, the determined $b_i$'s for L2 mode may be limited to a smaller number of sub-carriers, and thus may be stored advantageously in a smaller memory space in a typical memory block size, e.g. 1024. For example, in L0 mode, 869 bins may be used. In L2 mode 128 bins may be used. The determined $b_i$'s may be stored in the excess space between 895 and 1023. For the bins transmitted in the range 128 to 869, the mapper can use a default value of $b_i'=0$ and forward a default number of bits, e.g. 2, for each of these bins from the PRBS to the encoder which uses the L0 gain values for these bins. A similar storage scheme may be employed on the receiver side for decoding.

Figure 3:
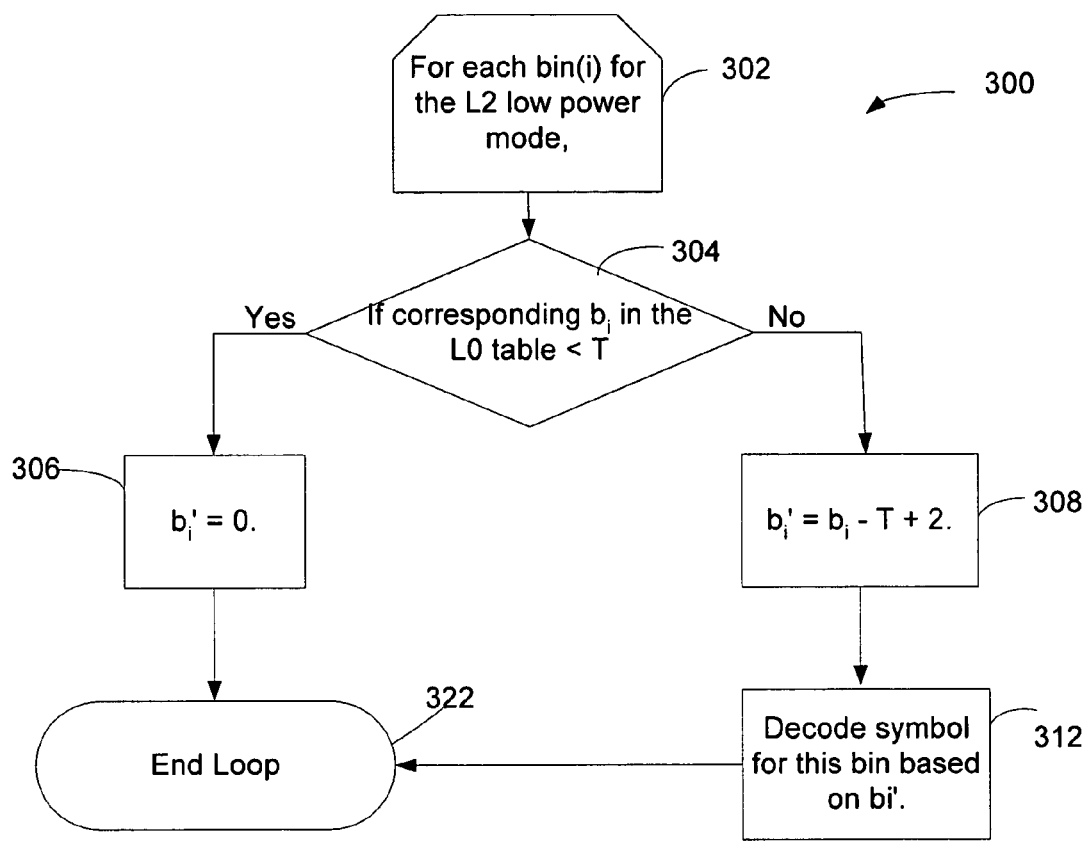
FIG. 3 illustrates a method for reusing bit allocations and gain factors for a normal data transmission mode in a low power mode for use in a DSL receiver in accordance with an embodiment of the present invention.

FIG. 3 illustrates a method 300 for reusing bit allocations for the normal data transmission mode (e.g. L0 mode) in a low power mode (e.g. L2 mode) for use in a DSL receiver in accordance with an embodiment of the present invention. The method embodiment 300 is discussed in the context of the receiver 104 of FIG. 1 for illustrative purposes. For 302 each bin(i) in the set of sub-carriers for the L2 low power mode, the demapper unit 180 determines 304 whether the corresponding bits allocated, $b_i$, for the ith sub-carrier in the L0 table are less than the bit allocation size threshold T. Responsive to the $b_i$ in the L0 table for the corresponding bin being less than the threshold T, the demapper 180 determines 306 the $b_i'$ for the bin for L2 mode is zero. The constellation decoder 162 processes the symbol as a dummy symbol based on the default bit number (e.g. 2). Typically, a constellation decoder does not decode bins with a bit allocation size of zero. Responsive to the $b_i$ in the L0 table for the corresponding bin not being less than the threshold T, the demapper 180 determines 308 the $b_i'$ for the bin for L2 mode in accordance with $b_i'=b_i-T+a$ constant. In one example, the constant is 2. Alternatively, $b_i'$ can be set to a preset value, for example 2. The constellation decoder 162 decodes 312 the symbol for the bin based on the determined L2 bin size $b_i'$ for the ith sub-carrier.

The foregoing description of the embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the hereto appended claims.

What is claimed is:

1. A Digital Subscriber Line system comprising a transmitter for reusing bit allocations and gain factors for a normal data transmission mode in a low power mode, the transmitter comprising:
   a first memory for storing the bit allocations and gain factors for the normal data transmission mode and a bit allocation threshold value, T;
   a constellation mapper communicatively coupled to the memory, a data buffer and a pseudo random sequence generator, the mapper determining a number of bits to be retrieved for an ith sub-carrier, $b_i'$, in a low power mode based on a number of bits allocated, $b_i$, for the ith sub-carrier in the normal transmission mode and the bit allocation threshold T;
   a transmitter control unit communicatively coupled to the constellation mapper and the memory, the control unit processing messages from a receiver, including messages related to mode operation; and
   a constellation encoder communicatively coupled to receive the determined number of bits for the ith sub-carrier from the mapper; and
   the system further comprising a receiver for reusing bit allocations and gain factors for the normal data transmission mode in a low power mode, the receiver comprising:
   a second memory for storing the bit allocations and the gain factors for the normal data transmission mode and the bit allocation threshold value, T;
   a constellation demapper communicatively coupled to the memory and communicatively coupled to receive a signal in an ith sub-carrier from the transmitter, the demapper determining the number of bits, $b_i'$, allocated by the transmitter for this ith sub-carrier, in the low power mode based on the number of bits allocated, $b_i$, for the ith sub-carrier in the normal transmission mode and the bit allocation threshold T;
   a receiver control unit communicatively coupled to the constellation demapper and the memory, the control unit processing messages related to mode operation from the transmitter; and
   a constellation decoder communicatively coupled to receive an indicator of the determined number of bits allocated for the ith sub-carrier from the demapper.

2. A Digital Subscriber Line system comprising a transmitter for reusing bit allocations and gain factors for a normal data transmission mode in a low power mode, the transmitter comprising:
   a first memory for storing the bit allocations and gain factors for the normal data transmission mode and a bit allocation threshold value, T;
   a constellation mapper communicatively coupled to the memory, a data buffer and a pseudo random sequence generator, the mapper determining a number of bits to be retrieved for an ith sub-carrier, $b_i'$, in a low power mode based on a number of bits allocated, $b_i$, for the ith sub-carrier in the normal transmission mode and the bit allocation threshold T;
   a transmitter control unit communicatively coupled to the constellation mapper and the memory, the control unit processing messages from a receiver, including messages related to mode operation; and
   a constellation encoder communicatively coupled to receive the determined number of bits for the ith sub-carrier from the mapper; and
   wherein the constellation mapper, responsive to the number of bits allocated for the ith sub-carrier, $b_i$, in the normal transmission mode being less than a bit allocation per sub-carrier threshold T, retrieving a default number of bits for the ith-sub-carrier in the low power mode from the pseudo random sequence generator, and responsive to a gain scale factor, $g_i$, for the corresponding ith sub-carrier in the normal data transmission mode being non-zero, the transmitter transmitting a dummy signal in the ith-subcarrier.

3. A Digital Subscriber Line system comprising a transmitter for reusing bit allocations and gain factors for a normal data transmission mode in a low power mode, the transmitter comprising:
   a first memory for storing the bit allocations and gain factors for the normal data transmission mode and a bit allocation threshold value, T;
   a constellation mapper communicatively coupled to the memory, a data buffer and a pseudo random sequence generator, the mapper determining a number of bits to be retrieved for an ith sub-carrier, $b_i'$, in a low power mode based on a number of bits allocated, $b_i$, for the ith sub-carrier in the normal transmission mode and the bit allocation threshold T;
   a transmitter control unit communicatively coupled to the constellation mapper and the memory, the control unit processing messages from a receiver, including messages related to mode operation; and
   a constellation encoder communicatively coupled to receive the determined number of bits for the ith sub-carrier from the mapper; and
   wherein the constellation mapper, responsive to the number of bits allocated for the ith sub-carrier, $b_i$, in the normal transmission mode being greater than or equal to a bit allocation per sub-carrier threshold T, selects the number of bits to be retrieved, $b_i'$, for the ith sub-carrier in the low power mode in accordance with $b_i'=b_i-T+$a constant.

4. A Digital Subscriber Line system comprising a transmitter for reusing bit allocations and gain factors for a normal data transmission mode in a low power mode, the transmitter comprising:
   a first memory for storing the bit allocations and gain factors for the normal data transmission mode and a bit allocation threshold value, T;
   a constellation mapper communicatively coupled to the memory, a data buffer and a pseudo random sequence generator, the mapper determining a number of bits to be retrieved for an ith sub-carrier, $b_i'$, in a low power mode based on a number of bits allocated, $b_i$, for the ith sub-carrier in the normal transmission mode and the bit allocation threshold T;
   a transmitter control unit communicatively coupled to the constellation mapper and the memory, the control unit processing messages from a receiver, including messages related to mode operation; and a constellation encoder communicatively coupled to receive the determined number of bits for the ith sub-carrier from the mapper; and wherein the constellation mapper, responsive to the number of bits allocated for the ith sub-carrier, $b_i$, in the normal transmission mode being greater than or equal to a bit allocation per sub-carrier threshold T, selects two bits as the number of bits to be retrieved, $b_i'$, for the ith-sub-carrier in the low power mode.

5. The system of claim 4 wherein, responsive to the number of bits allocated for the ith sub-carrier, $b_i$, in the normal transmission mode being greater than or equal to a bit allocation per sub-carrier threshold T, the constellation encoder encoding the number of bits $b_i'$ for the ith sub-carrier into a signal using the gain scale factor $g_i$ for the corresponding ith sub-carrier used in normal mode.

6. A Digital Subscriber Line system comprising a transmitter for reusing bit allocations and gain factors for a normal data transmission mode in a low power mode, the transmitter comprising:

a first memory for storing the bit allocations and gain factors for the normal data transmission mode and a bit allocation threshold value, T;

a constellation mapper communicatively coupled to the memory, a data buffer and a pseudo random sequence generator, the mapper determining a number of bits to be retrieved for an ith sub-carrier, $b_i'$, in a low power mode based on a number of bits allocated, $b_i$, for the ith sub-carrier in the normal transmission mode and the bit allocation threshold T;

a transmitter control unit communicatively coupled to the constellation mapper and the memory, the control unit processing messages from a receiver, including messages related to mode operation; and a constellation encoder communicatively coupled to receive the determined number of bits for the ith sub-carrier from the mapper; and wherein the transmitter transmits a combined signal of the sub-carriers for the low power mode at about or below a power reduction level and wherein the power reduction level is less than or equal to a power reduction level based on the size of the bit allocation threshold T wherein the power reduction level satisfies a signal-to-noise (SNR) margin which is about equal to the SNR margin for the normal transmission mode plus a power factor scaled by the difference between the SNR margin required to support a bit constellation having the bit threshold T size and a constant constellation bit size.

7. The system of claim 6 wherein the combined signal is transmitted at about or below a power reduction level which is the lesser of a maximum allowable power cutback level or the power reduction level based on the size of the bit allocation threshold T.

8. In a Digital Subscriber Line system, a method for determining the number of bits to be retrieved for an ith sub-carrier, $b_i'$, in a low power mode based upon a bit allocation $b_i$ for the ith sub-carrier in a normal transmission mode, the method comprising:

responsive to the number of bits allocated for the ith sub-carrier, $b_i$, in the normal transmission mode being less than a bit allocation per sub-carrier threshold T, selecting a default number of bits to be retrieved for the ith-sub-carrier in the low power mode; and responsive to the number of bits to be retrieved, $b_i'$, for the ith-subcarrier in the low power mode being the default value and the normal data transmission mode gain scale factor, $g_i$, for the ith sub-carrier being non-zero, transmitting a dummy signal in the ith-subcarrier.

9. The method of claim 8 further comprising:

responsive to the number of bits allocated for the ith sub-carrier, $b_i$, in the normal transmission mode being greater than or equal to a bit allocation per sub-carrier threshold T, selecting the number of bits to be retrieved, $b_i'$, for the ith-sub-carrier in the low power mode in accordance with $b_i'=b_i-T+$a constant.

10. The method of claim 8 further comprising:

responsive to the number of bits allocated for the ith sub-carrier, $b_i$, in the normal transmission mode being greater than a bit allocation per sub-carrier threshold T, selecting two bits as the number of bits to be retrieved, $b_i'$, for the ith-sub-carrier in the low power mode.

11. The method of claim 9 further comprising:

responsive to the number of bits allocated for the ith sub-carrier, $b_i$, in the normal transmission mode being greater than or equal to a bit allocation per sub-carrier threshold T, encoding the number of bits $b_i'$ for the ith sub-carrier into a signal in the low power mode using the gain scale factor $g_i$ for the corresponding ith sub-carrier used in normal mode.

12. The method of claim 9 further comprising:

responsive to receiving a signal in the ith-sub-carrier, determining the number of bits, $b_i'$, that have been allocated at a transmitter for the ith sub-carrier in the low power mode based upon the bit allocation $b_i$ for the ith sub-carrier for the normal data transmission mode.

13. The method of claim 12 further comprising:

responsive to the number of bits allocated for the ith sub-carrier, $b_i$, in the normal transmission mode being less than the bit allocation per sub-carrier threshold T, identifying that the ith sub-carrier is carrying a dummy signal.

14. The method of claim 13 further comprising:

responsive to the number of bits allocated for the corresponding ith sub-carrier, $b_i$, in the normal transmission mode being greater than or equal to a bit allocation per sub-carrier threshold T, determining the number of bits, $b_i'$, for the ith-sub-carrier in the low power mode in accordance with $b_i'=b_i-T+$a constant; and decoding the symbol for the ith sub-carrier based on $b_i'$.

15. The method of claim 12 further comprising:

responsive to the number of bits allocated for the corresponding ith sub-carrier, $b_i$, in the normal transmission mode being greater than or equal to a bit allocation per sub-carrier threshold T, identifying two bits as the number of bits $b_i'$, for the ith-sub-carrier in the low power mode; and decoding the symbol for the ith sub-carrier based on $b_i'$.

16. A Digital Subscriber Line system comprising a transmitter for reusing bit allocations and gain factors for a normal data transmission mode in a low power mode, the transmitter comprising:

means for storing the bit allocations and gain factors for the normal data transmission mode and a bit allocation size threshold value, T;

means for determining a number of bits to be retrieved for an ith sub-carrier, $b_i'$, in a low power mode based on a number of bits allocated, $b_i$, for the ith sub-carrier in the normal transmission mode and the bit allocation size threshold T being communicatively coupled to the means for storing, a data buffer and a pseudo random sequence generator;

means for processing messages from a receiver, including messages related to mode operation, communicatively coupled to the means for determining a number of bits to be retrieved and the means for storing; and means for constellation encoding communicatively coupled to receive the determined number of bits for the ith sub-carrier for the means for determining a number of bits to be retrieved in a low power mode; and the system further comprising a receiver for reusing the bit allocations for the normal data transmission mode in the low power mode, the receiver comprising:

a second means for storing the bit allocations for the normal data transmission mode and the bit allocation threshold value, T;

means for determining the number of bits, $b_i'$, allocated by the transmitter for this ith sub-carrier, the low power mode based on the number of bits allocated, $b_i$, for the ith sub-carrier in the normal transmission mode and the bit allocation threshold T, being communicatively coupled to the second means for storing and communicatively coupled to receive a signal in the ith sub-carrier from the transmitter;

means for processing messages related to mode operation from the transmitter communicatively coupled to the means for determining the number of bits, $b_i'$, allocated by the transmitter and the second means for storage; and means for constellation decoding communicatively coupled to receive an indicator of the determined number of bits allocated for the ith sub-carrier from the means for determining the number of bits, $b_i'$, allocated by the transmitter.

* * * * *